US008299995B2

(12) United States Patent
Jeong et al.

(10) Patent No.: US 8,299,995 B2
(45) Date of Patent: Oct. 30, 2012

(54) LIQUID CRYSTAL DISPLAY AND METHOD OF CONTROLLING COMMON VOLTAGE THEREOF

(75) Inventors: Jae-Won Jeong, Seoul (KR); Bong-Im Park, Cheonan-si (KR); Yong-Jun Choi, Cheonan-si (KR); Bong-Ju Jun, Cheonan-si (KR); Yun-Jae Kim, Asan-si (KR); Dong-Gyun Ra, Asan-si (KR); Dong-Beom Cho, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 611 days.

(21) Appl. No.: 12/364,774

(22) Filed: Feb. 3, 2009

(65) Prior Publication Data

US 2010/0033414 A1 Feb. 11, 2010

(30) Foreign Application Priority Data

Aug. 6, 2008 (KR) ........................ 10-2008-0077035

(51) Int. Cl.
*G06K 9/36* (2006.01)

(52) U.S. Cl. ............................. 345/89; 345/690; 345/87

(58) Field of Classification Search ........................ None
See application file for complete search history.

(56) References Cited

U.S. PATENT DOCUMENTS

| | | | | |
|---|---|---|---|---|
| 6,343,159 | B1 * | 1/2002 | Cuciurean-Zapan et al. | 382/284 |
| 7,102,604 | B2 * | 9/2006 | Hong | 345/87 |
| 7,170,535 | B2 * | 1/2007 | Matsuda | 345/690 |
| 2009/0284456 | A1 * | 11/2009 | Song et al. | 345/94 |

* cited by examiner

*Primary Examiner* — Joseph Haley
(74) *Attorney, Agent, or Firm* — Cantor Colburn LLP

(57) ABSTRACT

A liquid crystal display includes a liquid crystal panel having a plurality of pixels, a lookup table which stores information about a plurality of digital common voltages, each of the plurality of digital common voltages corresponding to at least one gray value, a timing controller which analyzes gray characteristics of image signals to be displayed on the liquid crystal panel and which selects one of the digital common voltages based on an analysis result, and a common voltage generator which generates an analog common voltage in response to the digital common voltage selected by the timing controller and which supplies the analog common voltage to the liquid crystal panel.

18 Claims, 8 Drawing Sheets

LIQUID CRYSTAL DISPLAY AND METHOD OF CONTROLLING COMMON VOLTAGE THEREOF

This application claims priority to Korean Patent Application No. 2008-77035, filed on Aug. 6, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display and a method of controlling a common voltage of the same.

2. Description of the Related Art

Recently, as a personal computers and televisions have shown a tendency toward lightness and slimness, lightness and slimness of a display apparatus have become increasingly important. Thus, cathode ray tubes ("CRTs") have been increasingly replaced by flat panel displays.

A typical flat panel display is a term used to describe various display types, such as a liquid crystal display ("LCD"), a field emission display ("FED"), an organic light emitting display ("OLED"), a plasma display panel ("PDP") and other similar displays. Among them, the LCD has been extensively used as a display apparatus in a mobile apparatus, e.g. a portable computer, a personal digital assistant ("PDA") and a mobile phone due to superior image quality, lightness, slimness and low power consumption thereof. The typical LCD includes two transparent substrates (e.g., glass substrates), each substrate having one of pixel and common electrodes, respectively, and a liquid crystal layer formed between the substrates. The LCD adjusts transmittance of light passing through the liquid crystal layer by adjusting the intensity of an electric field applied to the liquid crystal layer by the electrodes, thereby displaying a desired image.

If the LCD is applied to use as a transmissive TV monitor, a flicker and a residual image occur on the TV monitor in the early stage of the ON/OFF operation. This is because electrodes, which face each other while interposing a liquid crystal layer therebetween, serve as capacitive devices when a power is applied to the LCD. In addition, since the alignment of liquid crystal is temporarily unstable in the early stage of the operation or after the LCD has been driven, the flicker and residual image occur.

BRIEF SUMMARY OF THE INVENTION

An exemplary embodiment of the present invention provides a liquid crystal display ("LCD") capable of preventing a flicker and a residual image.

Another exemplary embodiment of the present invention provides a method of controlling a common voltage of the liquid crystal display without using additional circuit lines and interconnections.

In an exemplary embodiment of the present invention, an LCD includes; a liquid crystal panel, a lookup table which stores information about a plurality of digital common voltages, each of the plurality of digital common voltages corresponding to at least one gray value, a timing controller which analyzes gray characteristics of image signals to be displayed on the liquid crystal panel and then selects one of the digital common voltages based on an analysis result, and a common voltage generator which generates an analog common voltage in response to the digital common voltage selected by the timing controller and which supplies the analog common voltage to the liquid crystal panel.

In one exemplary embodiment, the timing controller analyzes the gray characteristic of the image signal at least every frame.

In one exemplary embodiment, the timing controller determines a representative gray value using a histogram analysis result obtained based on gray values of substantially all of the image signals, and selects the digital common voltage corresponding to the representative gray value from the lookup table.

In one exemplary embodiment, the timing controller determines a representative gray ratio using a histogram analysis result obtained based on each gray value of a red signal, a green signal and a blue signal constituting the image signal, and selects the digital common voltage corresponding to the representative gray ratio from the lookup table.

In one exemplary embodiment, the histogram analysis result obtained based on each gray value of the red signal, the green signal and the blue signal is multiplied by a weight value.

In one exemplary embodiment, the timing controller determines a representative gray value using an average of brightness components of gray values of the image signals, and selects the digital common voltage corresponding to the representative gray value from the lookup table.

In one exemplary embodiment, the brightness components are obtained by converting the image signals into national television system committee ("NTSC") signals.

In one exemplary embodiment, the timing controller determines a representative gray value using an average of gray values of the image signals, and selects the digital common voltage corresponding to the representative gray value from the lookup table.

In one exemplary embodiment, the timing controller transmits the information about the digital common voltages to the common voltage generator through an inter-integrated circuit interface.

In one exemplary embodiment, a voltage level of the analog common voltage is gradually changed over a plurality of frames when a voltage variation range of the analog common voltage exceeds a predetermined voltage level.

In one exemplary embodiment, the voltage variation range of the analog common voltage is restricted to be within a predetermined voltage level per frame.

In another exemplary embodiment of the present invention, a method of generating common voltage includes analyzing gray characteristics of image signals, determining a representative gray value based on the analysis result, determining a digital common voltage corresponding to the representative gray value, and generating an analog common voltage corresponding to the digital common voltage.

In one exemplary embodiment, the digital common voltage is updated at least every frame.

In one exemplary embodiment, a gray value having a highest frequency is determined to be the representative gray value.

In one exemplary embodiment, the analyzing of the gray characteristic includes converting the image signal into a gray signal and analyzing a histogram of the gray signal is analyzed.

In one exemplary embodiment, the analyzing of the gray characteristic includes; converting a red signal, a green signal and a blue signal constituting the image signal into gray signals, respectively, analyzing a histogram of the gray signals, determining representative gray values of the gray signals based on a histogram analysis result, respectively, and multiplying the representative gray values by a weight value.

In one exemplary embodiment, the analyzing of the gray characteristic includes; converting the image signals into NTSC signals and converting the NTSC signals into gray signals including brightness components.

In one exemplary embodiment, in order to analyze the gray characteristic, the image signals are converted into gray signals, and an average of the gray signals is calculated.

In one exemplary embodiment, the average of the gray signals can be obtained based on red, green, and blue gray signals constituting the image signals.

In one exemplary embodiment, the average of the gray signals can be obtained based on the gray signals of the image signals consisting of brightness components.

According to the above, a flicker and a residual image can be minimized in the LCD and an image display quality of the LCD can be improved in real time without using additional circuit lines and interconnections.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
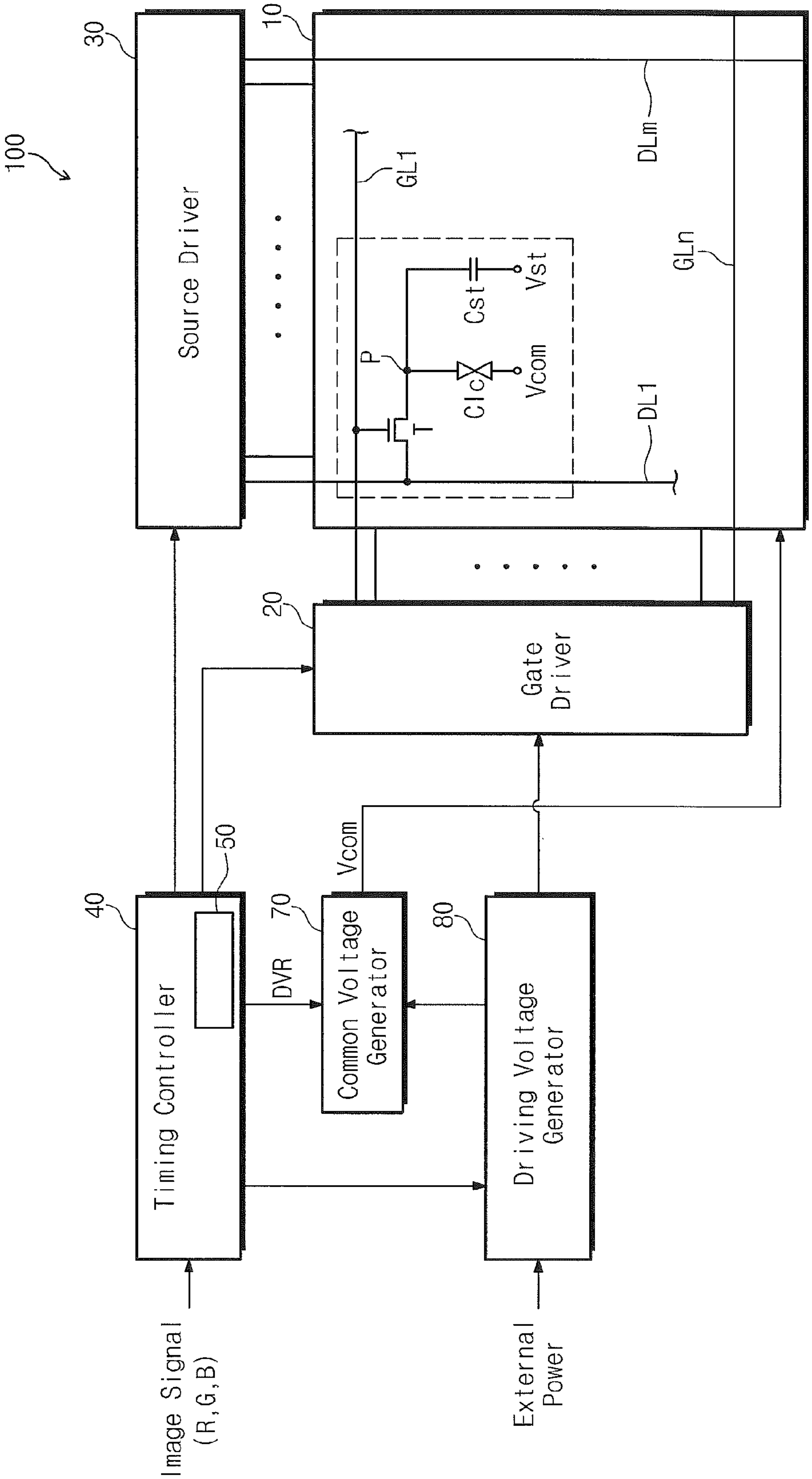
FIG. 1 is a block diagram illustrating an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Hereinafter, an exemplary embodiment of a liquid crystal display ("LCD") and a method of controlling a common voltage thereof according to the present invention will be explained in detail with reference to the accompanying drawings. This is for illustrative purpose only, and it should be noted that the LCD a can be variously modified within the scope of the present invention.

The exemplary embodiment of an LCD according to the present invention adjusts a level of a common voltage Vcom applied to a liquid crystal panel in real time based on gray distribution of image signals R, G and B displayed on a screen. The common voltage Vcom is adjusted to have an optimum level to minimize a flicker of the image signal. As a result, the flicker and residual image can be minimized in the LCD and the image quality of the LCD can be improved in real time without using additional circuit lines and interconnections. Hereinafter, a structure of the exemplary embodiment of an LCD and an exemplary embodiment of a method of generating the common voltage in the LCD will be described.

FIG. 1 is a block diagram illustrating an exemplary embodiment of a LCD according to the present invention.

Referring to FIG. 1, the LCD 100 includes a liquid crystal panel 10, a gate driver 20, a source driver 30, a timing controller 40, a common voltage generator 70, and a driving voltage generator 80.

In the present exemplary embodiment, the liquid crystal panel 10 includes a top substrate having a common electrode and a bottom substrate having a pixel electrode P. Liquid crystal is injected between the top and bottom substrates. A plurality of gate lines GL1 to GLn is aligned on the bottom substrate at a substantially regular interval. In addition, a plurality of data lines DL1 to DLm is aligned substantially perpendicular to the gate lines GL1 to GLn at a regular interval. Pixels are arranged in pixel areas surrounded by the gate lines GL1 to GLn and the data lines DL1 to DLm. In the present exemplary embodiment, the pixels include a red pixel R, a green pixel G and a blue pixel B. In the present exemplary embodiment, the R, G and B pixels together form a display group. Also in the present exemplary embodiment, the red pixel R, the green pixel G and the blue pixel B, which constitute the display group, are continuously aligned in the row direction.

As shown in FIG. 1, each pixel includes a thin film transistor T, a liquid crystal capacitor Clc and a storage capacitor Cst, which are connected to the thin film transistor T in parallel. The liquid crystal capacitor Clc corresponds to liquid crystal charge capacitance, and the storage capacitor Cst corresponds to pixel charge capacitance.

In one exemplary embodiment, the timing controller 40 receives image signals R, G and B and an image control signal CS from an external graphic controller (not shown). Alternative exemplary embodiments include configurations wherein the timing controller 40 may generate the image control signal CS internally. The image control signal CS is used to control display of the image signals R, G and B. The image signals R, G and B include raw image data (that is, red, green and blue data). In one exemplary embodiment, the image control signal CS includes a vertical synchronous signal Vsync, a horizontal synchronous signal Hsync, a main cluck CLK, and a data enable signal DE; although alternative exemplary embodiments may include additional or fewer image control signals as necessary. The timing controller 40 processes the image signals R, G and B suitably for the operation condition of the LCD 100. Furthermore, the timing controller 40 may generate a plurality of control signals including a gate control signal and a data control signal.

In addition, the timing controller 40 analyzes gray distribution of the image signals R, G and B through an image processor 50 to update a digital Vcom generation value ("DVR") in real time. The DVR is digital common voltage information used to generate the common voltage Vcom and to determine the voltage level of the common voltage Vcom. In one exemplary embodiment, the DVR may be updated in every n frame (wherein n is an integer equal to or greater than 1). An exemplary embodiment of a method of updating the DVR will be described later with reference to FIGS. 2 to 7.

The DVR is updated to have an optimum value adapted to minimize the flicker and residual image of the image signals displayed on a screen. The DVR corresponds to the level of the common voltage Vcom, so the flicker and residual image may vary depending on the voltage level of the common voltage Vcom. Therefore, the voltage level of the common voltage Vcom capable of minimizing the flicker in correspondence with the gray value and gray range may vary. A specific voltage level of the common voltage Vcom capable of minimizing the flicker over the whole array of gray ranges does not exist. According to the present exemplary embodiment, the gray characteristic of the image to be displayed on the screen is analyzed, the DVR is determined on the basis of the gray value represented in the gray characteristic of the image at the highest ratio, and the level of the common voltage Vcom is adjusted using the DVR. Optimum values of the DVR capable of minimizing the flicker at each gray value can be stored in a lookup table LUT. According to one exemplary embodiment, the optimum DVR can be obtained through experiment. Accordingly, the level of the common voltage Vcom capable of minimizing the flicker and residual image in the LCD 100 can be updated in real time.

The driving voltage generator 80 generates internal voltages using an externally supplied voltage Vcc to drive the liquid crystal panel 10. For instance, in one exemplary embodiment, the driving voltage generator 80 generates an analog driving voltage AVDD, a gate on voltage Von, and a gate off voltage Voff. The analog driving voltage AVDD is applied to a gamma voltage generator (not shown) to generate gamma voltages to be supplied to the source driver 30, and the gate-on voltage Von and the gate off voltage Voff are applied to the gate driver 20. In addition, in the present exemplary embodiment, the driving voltage generator 80 supplies the external supply voltage Vcc to the common voltage generator 70 to convert the common voltage Vcom. The operation of the driving voltage generator 80 is controlled by the timing controller 40.

The common voltage generator 70 receives the DVR from the timing controller 40 to generate the analog common voltage Vcom. The analog common voltage Vcom generated by the common voltage generator 70 is transferred to a common electrode in the liquid crystal panel 10. The timing controller 40 transmits the DVR to the common voltage generator 70 by updating the DVR in real time according to the gray characteristics of the image signal to be displayed on the screen. Therefore, the analog common voltage Vcom, which is made to correspond to the updated DVR, is also updated in real time according to the gray characteristics of the image signal to be displayed on the screen.

The gate driver 20 applies the gate on voltage Von and the gate off voltage Voff to the gate lines GL1 to GLn according to the vertical synchronization start signal STVP. The gate on voltage Von is sequentially applied to all gate lines GL1 to GLn during one frame such that the pixels of the liquid crystal panel 10 can be sequentially scanned row by row.

The source driver 30 generates gray signals using the data control signal and the image signal of the timing controller 40 and the analog driving voltage AVDD of the driving voltage generator 80 and applies the gray signals to the data lines DL1 to DLm. That is, the source driver 30 converts a digital image signal into an analog gray signal using the analog driving voltage AVDD in response to the data control signal. In addition, the source driver 30 supplies the analog gray signal to the data lines DL1 to DLm.

In one exemplary embodiment, the gate driver 20, the source driver 30, the timing controller 40, the common voltage generator 70, and the driving voltage generator 80 can be combined in the form of a control module. In such an exemplary embodiment, each component of the control module may be fabricated in the form of an IC chip so as to be electrically connected to the liquid crystal panel 10. In one exemplary embodiment, the liquid crystal panel 10 and the gate driver 20 may be formed on the same substrate to improve the degree of integration thereof and to simplify the manufacturing process of the resulting display. In such an exemplary embodiment, the control module includes the source driver 30, the timing controller 40, the common voltage generator 70, and the driving voltage generator 80.

Figure 2:
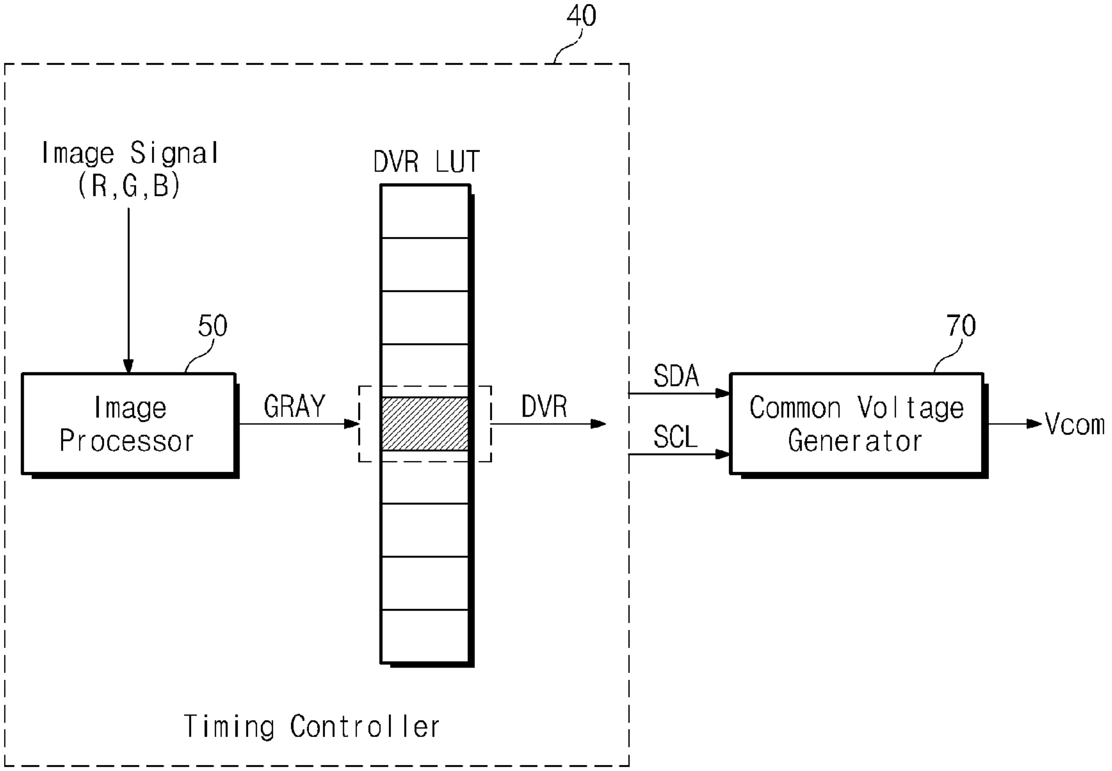
FIG. 2 is a block diagram illustrating an exemplary embodiment of a method of updating a DVR of a timing controller shown in FIG. 1.

FIG. 2 is a block diagram illustrating an exemplary embodiment of a method of updating the DVR of the timing controller 40 shown in FIG. 1.

Referring to FIG. 2, the timing controller 40 includes the image processor 50.

The image processor 50 converts the image signals R, G and B into gray data and obtains a histogram corresponding to the gray data. In addition, the image processor 50 analyzes the histogram and determines a representative gray value GRAY by selecting a gray value having the highest frequency in the image (that is, highest distribution in the image). In another exemplary embodiment, the representative gray value GRAY may be determined by selecting a range of gray values having the highest frequency in the image. In addition, the image processor 50 searches through the lookup table DVR LUT to select the DVR corresponding to the representative gray value, or gray range, GRAY. According to the present exemplary embodiment, the DVR can be determined by adding a corresponding logic to the timing controller without using an additional circuit. Thus, the DVR can be determined without using additional interconnections, memories or circuits.

In one exemplary embodiment, the lookup table DVR LUT may include a nonvolatile memory, exemplary embodiments of which include an electrically erasable programmable read-only memory ("EEPROM"). The lookup table DVR LUT stores optimum values of the DVR capable of minimizing the flicker and residual image at each gray value or each gray range (for instance, at the gray value of 0, 32, or 64). In one exemplary embodiment, the optimum values of the DVR corresponding to each gray value or each gray range can be obtained through experiment. Alternatively, the optimum values of the DVR may be obtained via calculation through an algorithm. In the exemplary embodiment wherein the image signal uses an 8-bit gray scale (that is, 256 individual gray scales), the optimum values of the DVR corresponding to the gray values of 0, 32, 64, . . . , 224, and 255 can be stored in the lookup table DVR LUT. In such an exemplary embodiment, each DVR consists of 1-byte of data. Thus, in the case of the 256 gray scales, 9-bytes of data (that is, nine DVRs) can be stored in the lookup table DVR LUT.

FIG. 2 shows an exemplary embodiment wherein the lookup table DVR LUT is provided within the timing controller 40. However, according to another exemplary embodiment of the present invention, the lookup table DVR LUT can be provided at an interior or an exterior of the timing controller 40. In addition, various memory cells can be used as well as the EEPROM to constitute the lookup table DVR LUT. Thus, the lookup table DVR LUT can be established in a predetermined region of the memory provided in the LCD 100 without using an additional memory. For instance, if the lookup table DVR LUT is provided at the exterior of the timing controller 40, the DVR stored in the lookup table DVR LUT may be loaded to the timing controller 40 when the LCD 100 is powered on.

The timing controller 40 searches for the optimum DVR value from the lookup table DVR LUT and provides the optimum DVR to the common voltage generator 70. In one exemplary embodiment, the optimum DVR is transmitted to the common voltage generator 70 through an inter-integrated circuit ("$I^2C$") interface in real time. The $I^2C$ interface employs a serial data ("SDA") signal to transmit the data (that is, DVR), and a serial clock ("SCL") signal as a clock signal. The DVR is transmitted during a vertical blank of the image signal. By transmitting the DVR during a vertically blank period of the image signal, the transmission of the data may be hidden from a user. The common voltage generator 70 generates the analog common voltage Vcom in response to the DVR received therein.

According to the present exemplary embodiment, the selection and transmission of the DVR can be repeated every n frames (wherein n is an integer equal to or greater than 1). The DVR consists of 1-byte data and the 1-byte DVR is transmitted to the common voltage generator 70 through the $I^2C$ interface within about 0.1 ms. Thus, a sufficient operational margin can be ensured even if the common voltage is adjusted every frame.

In the present exemplary embodiment, the $I^2C$ interface is provided between the timing controller 40 and the common voltage generator 70. However, this exemplary embodiment is for illustrative purposes only, and various interfaces can be employed if the interfaces are adaptable for use with the LCD 100.

Figure 3:
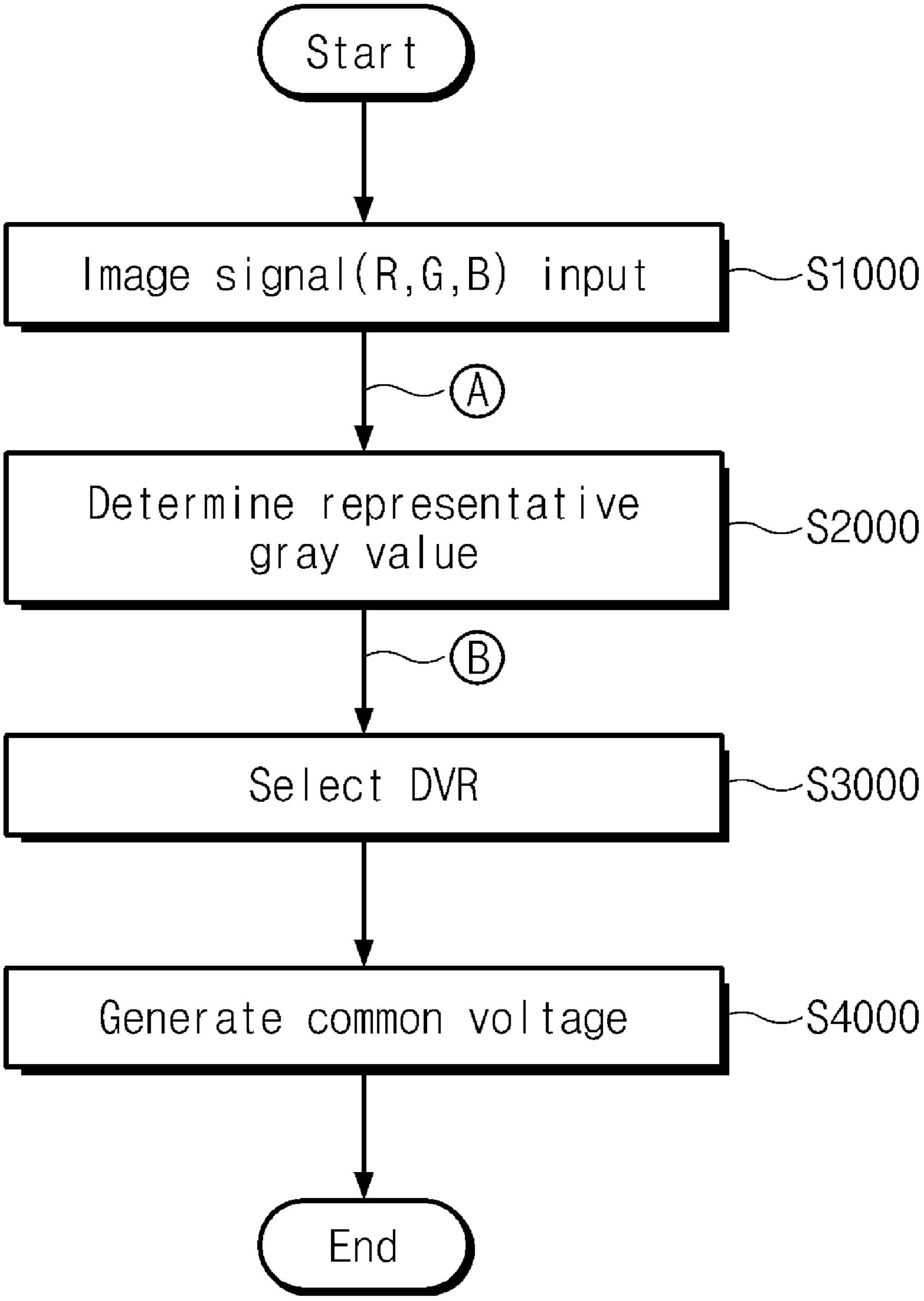
FIG. 3 is a flowchart illustrating an exemplary embodiment of a method of generating a common voltage according to the present invention.

FIG. 3 is a flowchart illustrating an exemplary embodiment of a method of generating a common voltage according to the present invention.

Referring to FIG. 3, the LCD 100 receives image signals R, G and B through the timing controller 40 (S1000). The timing controller 40 analyzes the image signals R, G and B using the image processor 50 and determines the representative gray value GRAY based on the analysis result (S2000). According to the current exemplary embodiment of the present invention, the representative gray value GRAY can be determined by analyzing the image signals R, G and B through various methods, which will be described below with reference to FIGS. 4 to 7.

Then, the timing controller 40 searches through the lookup table DVR LUT to select the DVR corresponding to the representative gray value GRAY (S3000). The selected DVR is supplied to the common voltage generator 70 through the $I^2C$ interface. The common voltage generator 70 generates the common voltage Vcom corresponding to the DVR supplied from the timing controller 40 (S4000). The common voltage Vcom is supplied to the liquid crystal panel 10. The common voltage Vcom supplied to the liquid crystal panel 10 through this method has an optimum level capable of minimizing the flicker of the image signal. Using the above described exemplary embodiment of a method, the common voltage Vcom is repeatedly updated to correspond to the gray value every n frames without using an additional memory or an additional circuit. Thus, the flicker and the residual image of the LCD 100 can be reduced at a low cost.

FIGS. 4 to 7 are flowcharts illustrating various exemplary embodiments to realize the determination of the representative gray value (S2000) shown in FIG. 3.

Figure 4:
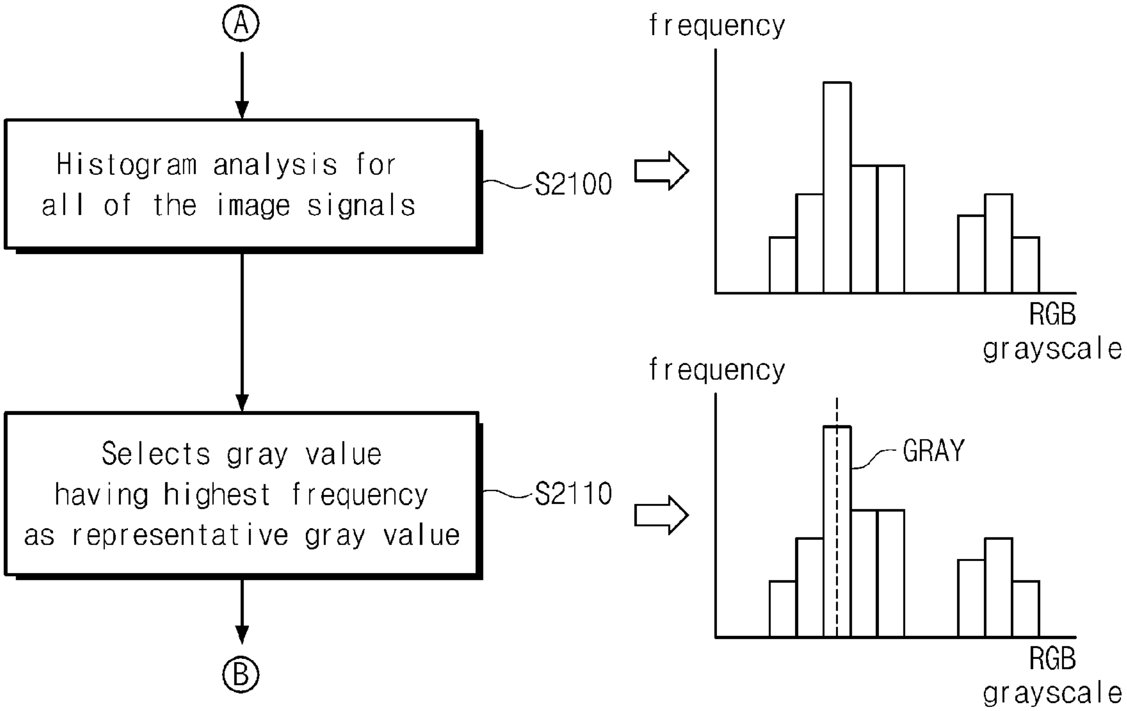
FIGS. 4 to 7 are flowcharts illustrating various exemplary embodiments to methods to determine a representative gray value (S2000) shown in FIG. 3.

FIG. 4 shows an exemplary embodiment of a method to determine the representative gray value GRAY using the histogram analysis result for all of the gray values of the image signals R, G and B. Referring to FIG. 4, the histogram of all of the gray values of the image signals R, G and B is analyzed to determine the representative gray value GRAY from the gray values of the image signals R, G and B (S2100). The histogram represents distribution of contrast values of the pixels corresponding to the image signals. The contrast value can be represented using the gray value. The distribution range of bright points and dark points and values thereof are shown in the histogram. In addition, the frequency of each contrast value is shown in the histogram. For instance, in the exemplary embodiment shown in FIG. 4, the gray values range from 0 to 255 (for instance, 0 represents black and 255 represents white) and the histogram shows the number of pixels corresponding to the gray values. After the histogram analysis has been performed, the gray value, or the gray range, having the highest frequency is determined as the representative gray value GRAY of the image signal (S2110). The representative gray value GRAY is used when selecting the DVR in step S3000 shown in FIG. 3.

Meanwhile, the representative gray value GRAY can be determined based on all of the image signals R, G and B, or can be determined based on an individual image signal. In one exemplary embodiment the representative gray value GRAY can be determined based on just the green image signal G, which has the highest brightness component. If the representative gray value GRAY is determined based on the green image signal G, the histogram analysis may be executed with respect to the green image signal G only.

Another exemplary embodiment to determine the representative gray value GRAY from the gray values of the image signals is as follows.

Figure 5:
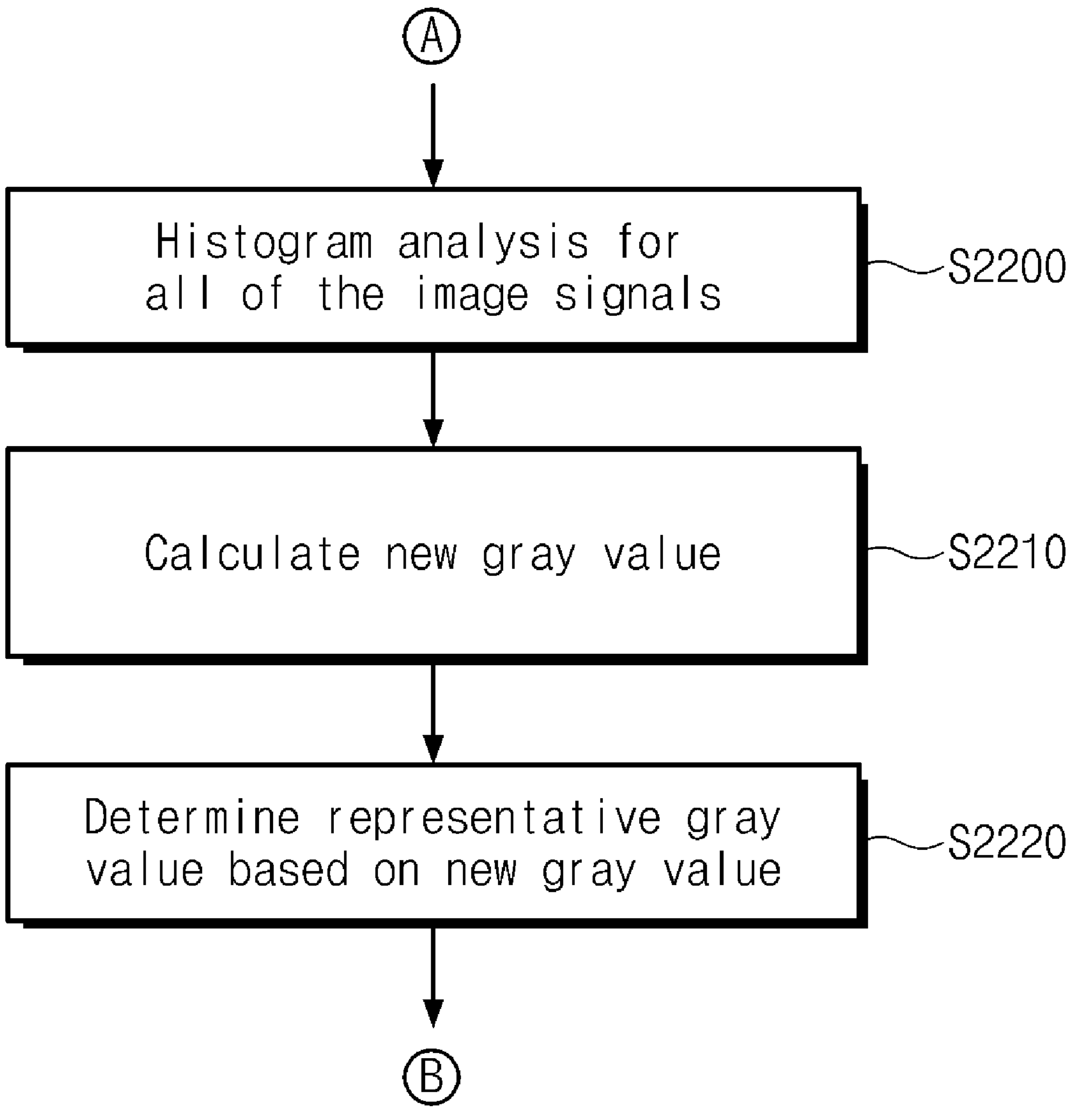

FIG. 5 shows another exemplary embodiment of a method to determine the representative gray value GRAY using the histogram analysis result obtained by analyzing each gray value of each image signal.

Referring to FIG. 5, the histogram analysis is executed with respect to each of the image signals R, G and B separately to determine the representative gray value GRAY from the gray values of the image signals R, G and B (S2200). Since the histogram may vary depending the image signals R, G and B, a new gray value is calculated by applying a brightness weight of the red signal R, the green signal G, and the blue signal B to the histogram analysis result for the red signal R, the green signal Q and the blue signal B (S2210). A method of obtaining the new gray value for the red signal KR the green signal G, and the blue signal B is as follows.

First, the gray value having the highest frequency (that is, highest distribution) is obtained from the histogram analysis result for the red signal R, the green signal G, and the blue signal B. The gray value having the highest frequency is referred to as the representative gray value for each color. For instance, a representative gray value gray_value_red refers to the gray value having the highest frequency in the histogram analysis result obtained from the red signal R, a representative gray value gray_value_green refers to the gray value having the highest frequency in the histogram analysis result obtained from the green signal G, and a representative gray value gray_value_blue refers to the gray value having the highest frequency in the histogram analysis result obtained from the blue signal B.

The red signal R, the green signal G, and the blue signal B have brightness components different from each other in the image signal of the liquid crystal panel 10. For instance, in one exemplary embodiment if the red signal R has the brightness component of 2, the green signal G has the brightness component of 5 and the blue signal B has the brightness component of 1. According to the present exemplary embodiment of the present invention, the ratio of the brightness component is used as a weight value for each color and the representative gray values gray_value_red, gray_value_green and gray_value_blue are multiplied by the weight value thereof, respectively. According to the present exemplary embodiment of the present invention, the result obtained by multiplying each representative gray value gray_value_red, gray_value_green or gray_value_blue by the weight value thereof is defined as a new gray value gray_ratio_red, gray_ratio_green, or gray_ratio_blue.

For instance, a new red gray value gray_ratio_red of the red signal R can be obtained by multiplying the representative gray value gray_value_red of the red signal R by the weight value 2. A new green gray ratio gray_ratio_green of the green signal G can be obtained by multiplying the representative gray value gray_value_green of the green signal G by the weight value 5. In addition, a new blue gray ratio gray_ratio_blue of the blue signal B can be obtained by multiplying the representative gray value gray_value_blue of the blue signal B by the weight value 1.

Then, the highest new gray value is selected from the new red gray value gray_ratio_red, the new green gray value gray_ratio_green, and the new blue gray value gray_ratio_blue of the image signals R, G and B, and the gray value having the highest frequency in the image signal having the highest new gray value is determined as the representative gray value GRAY of the image (S2220).

Figure 6:
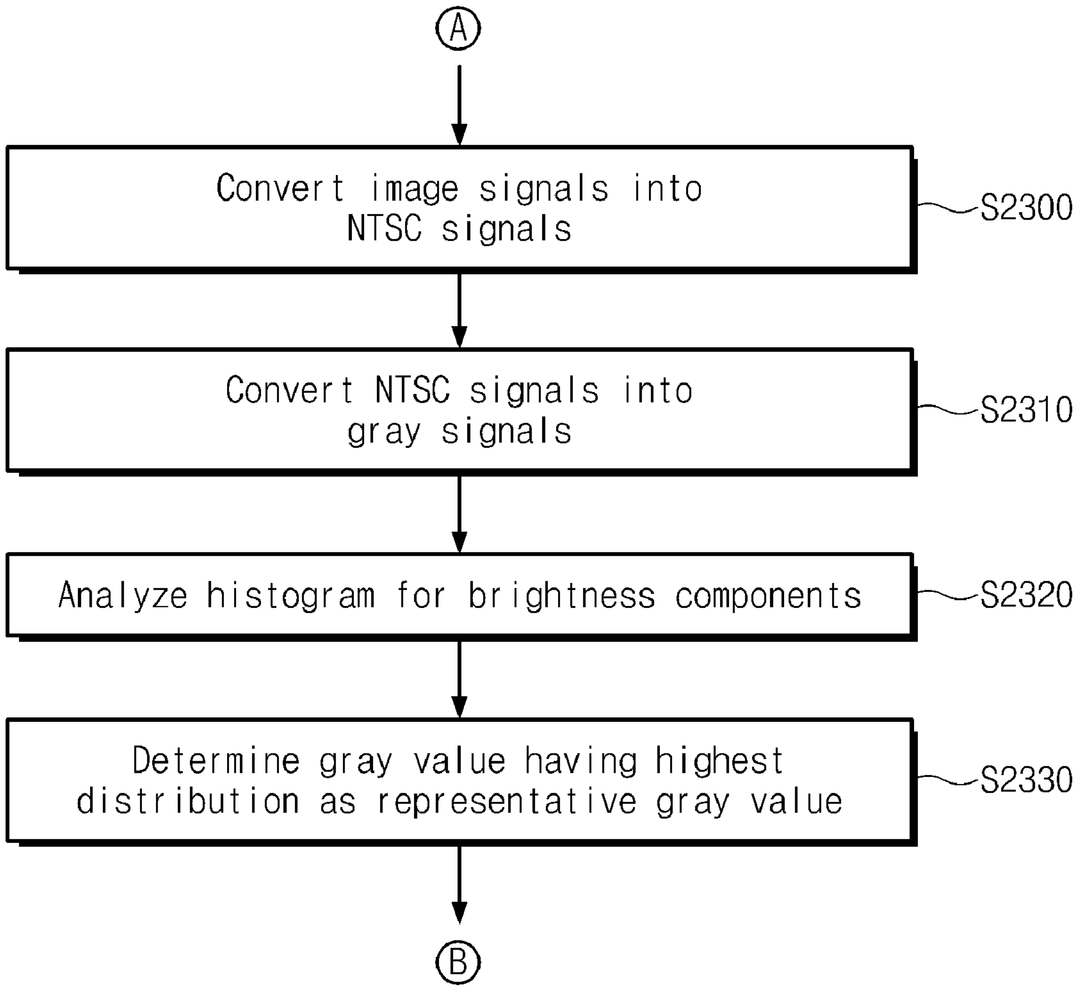

FIG. 6 shows an exemplary embodiment of a method to determine the representative gray value GRAY by analyzing the gray values including brightness components of the image signals R, G and B.

Referring to FIG. 6, in order to determine the representative gray value GRAY, the image signals R, G and B are converted into national television system committee ("NTSC") signals (S2300). A method of converting the image signals R, G and B into the NTSC signals is expressed in equation 1.

$$\begin{bmatrix} Y \\ I \\ Q \end{bmatrix} = \begin{bmatrix} 0.299 & 0.589 & 0.114 \\ 0.596 & -0.274 & -0.322 \\ 0.211 & -0.523 & 0.312 \end{bmatrix} \begin{bmatrix} R \\ G \\ B \end{bmatrix} \quad \text{Equation 1}$$

Y: Luminance (Y of CIE colorspace)

I: chrominance (orange-cyan hue)

Q: chrominance (green-magenta hue)

Various color expression systems can be used to express image signals. The NTSC signals are mainly used in television in the United States and employ Y, I and Q models. The NTSC signals are extensively used as a color system for hardware together with a RGB system that divides the image into the red signal R, the green signal G and the blue signal B.

In the NTSC signals, Y represents luminance, that is, brightness, and I and Q represent chrominance. In the above equation, I corresponds to a color obtained by removing cyan from orange, and Q corresponds to a color obtained by removing green from magenta.

Then, the NTSC signals are converted into gray signals (S2310). At this time, I and Q components are removed from the converted gray signals by setting the I and Q values to zero. As a result, only Y components remain in the converted gray signals. According to the experimental results, the human eye is more sensitive to brightness Y information than color information. In this regard, the present invention selectively employs the brightness Y when generating the common voltage Vcom to minimize flicker.

Next, the histogram analysis is executed with respect to the gray signal consisting of the brightness component Y (S2320). The frequency of each gray value can be expressed as a graph through the histogram analysis. Then, the gray value having the highest frequency in the image (that is, highest distribution in the image) is determined as the representative gray value GRAY (S2330).

Figure 7:
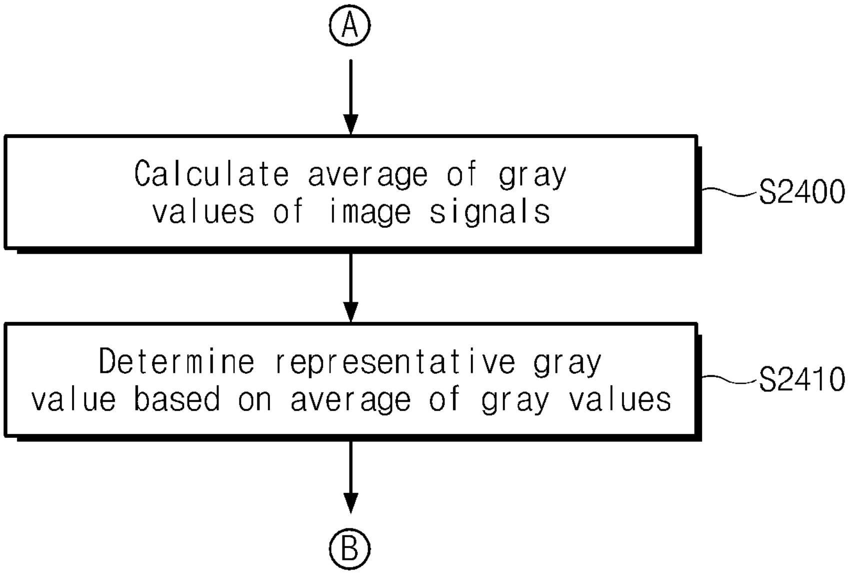

Another exemplary embodiment of a method of determining the representative gray value GRAY according to the present invention is described below. FIG. 7 shows another exemplary embodiment of a method of determining the representative gray value GRAY using the average gray value of the image signals R, G and B according to the present invention.

Referring to FIG. 7, in order to determine the representative gray value GRAY, the gray values of the red signal R, the green signal G and the blue signal B of the image signals R, G and B are obtained, respectively, and the average of the gray values is calculated (S2400). The average of the gray values can be calculated according to one of equations 2 and 3 shown below.

$$\text{average} = \frac{\sum_{j=1}^{v\_resolution}\left(\sum_{i=1}^{h\_resolution}\begin{pmatrix}\text{red\_gray}[i][j] + \\ \text{green\_gray}[i][j] + \\ \text{blue\_gray}[i][j]\end{pmatrix}\right)}{\text{resolution}\times 3} \quad \text{Equation 2}$$

Resolution = horizontal resolution × vertical resolution v_resolution: vertical resolution, h_resolution: horizontal resolution In equation 2, red_gray[i][j] represents the gray value of each red signal R contained in the image signals R, G and B, green_gray[i][j] represents the gray value of each green signal G contained in the image signals R, G and B, and blue_gray[i][j] represents the gray value of each blue signal B contained in the image signals R, G and B.

$$\text{average} = \frac{\sum_{j=1}^{v\_resolution}\left(\sum_{i=1}^{h\_resolution}\text{grayscale\_gray}[i][j]\right)}{\text{resolution}} \quad \text{Equation 3}$$

Resolution = horizontal resolution × vertical resolution v_resolution: vertical resolution, h_resolution: horizontal resolution In equation 3, grayscale_gray[i][j] represents each dot value of the gray value used to analyze the NTSC signals shown in FIG. 6 (that is, the gray value obtained from the gray signal consisting of brightness components).

If the average of the gray values has been calculated using one of Equations 2 and 3, the average gray value is determined as the representative gray value GRAY (S2410).

As mentioned above, according to the exemplary embodiment of a method of generating the common voltage Vcom of the present invention, the gray distribution characteristic of the image signals R, G and B is analyzed and the level of the common voltage Vcom applied to the liquid crystal panel is adjusted in real time using the analysis result. As discussed above, various methods can be adopted to analyze the gray distribution characteristic of the image signals R, G and B. To briefly summarize those various methods: the first method is to determine the representative gay value GRAY using the histogram analysis result obtained based on the whole gray values of the image signals R, G and B; the second method is to determine the representative gay value GRAY using the histogram analysis result obtained based on each gray value of the red signal R, the green signal G and the blue signal B contained in the image signals R, G and B; the third method is to determine the representative gay value GRAY using the average gray value of the gray signals having brightness components in the image signals R, G and B; the fourth method is to determine the representative gay value GRAY using the average gray value of the gray signals of the image signals R, G and B.

The common voltage Vcom is adjusted to have the optimum value capable of minimizing the flicker of the image signal. As a result, the flicker and residual image can be minimized in the LCD and the image quality of the LCD can be improved in real time without using additional circuit lines and interconnections.

Figure 8:
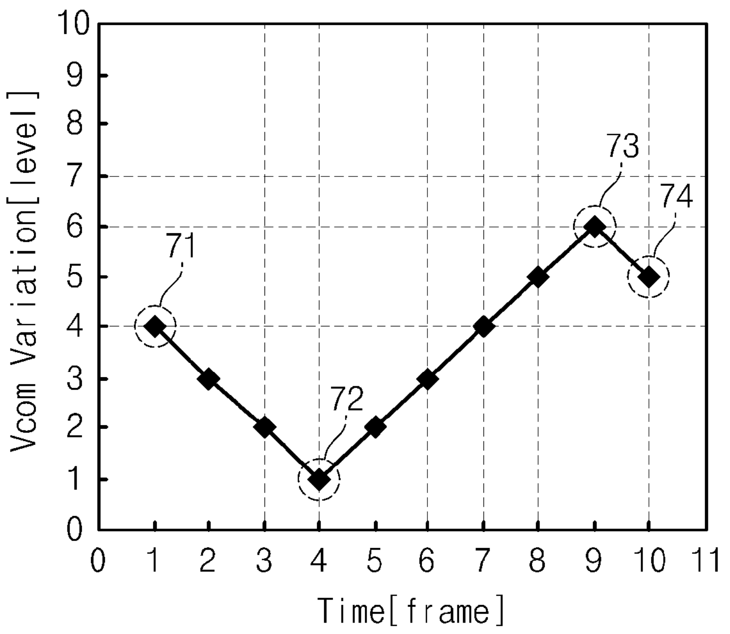
FIG. 8 is a graph illustrating an exemplary embodiment of a method of adaptively adjusting update time of a common voltage.

FIG. 8 is a graph illustrating an exemplary embodiment of a method of adaptively adjusting update time of the common voltage Vcom. In the present exemplary embodiment, if the common voltage Vcom is adjusted every frame, the flicker and the residual image can be minimized. However, if a large enough variation of the common voltage Vcom occurs between the frames, the user may recognize image variation due to the variation of the common voltage Vcom. In this regard, according to the present exemplary embodiment, the time to reach target common voltage from the present common voltage, that is, the number of frames, is adaptively adjusted based on the variation range of the common voltage Vcom as shown in FIG. 8.

Referring to FIG. 8, variation of the common voltage is divided into ten levels and the time (i.e., the number of frames) to go from a current common voltage to a target common voltage is adjusted according to the variation of the common voltage. For instance, if the common voltage is changed by 3 levels from 4-level (71) to 1-level (72), the common voltage is gradually changed step by step through 3 frames. In addition, if the common voltage is changed by 5 levels from 1-level (72) to 6-level (73), the common voltage is gradually changed step by step through 5 frames. In contrast, if the common voltage is changed by 1 level from 6-level (73) to 5-level (74), the common voltage is changed one time through 1 frame. In this manner, the common voltage is linearly updated according to the variation of the common voltage as shown in FIG. 8. However, alternative exemplary embodiments include configurations wherein the update time of the common voltage can be non-linearly calculated using predetermined functions. Since the common voltage is gradually changed, a natural appearing image can be provided to the user while minimizing the flicker and the residual image.

Figure 9:
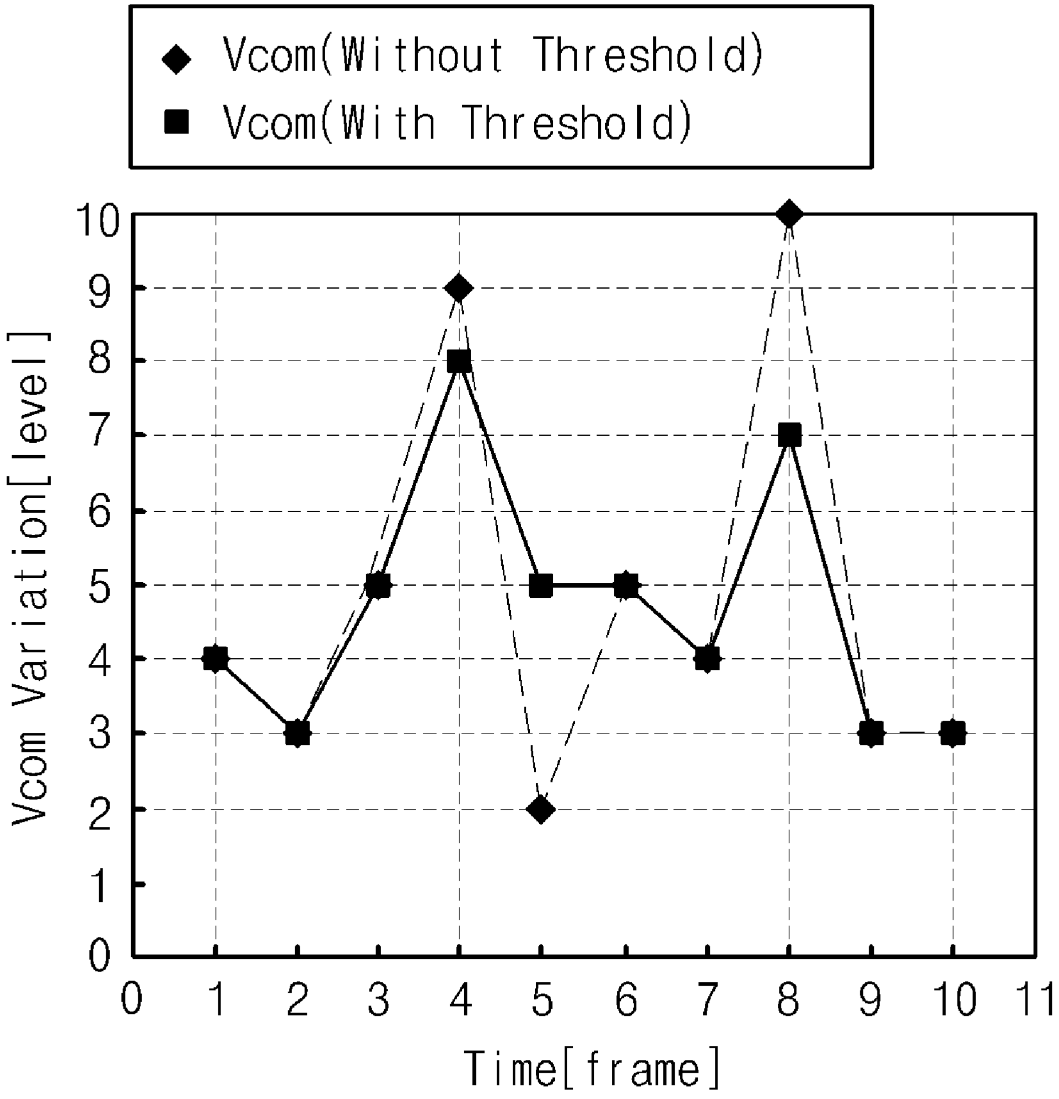
FIG. 9 is a graph illustrating an exemplary embodiment of a method of restricting variation of a common voltage within a predetermined range.

FIG. 9 is a graph illustrating another exemplary embodiment of a method of restricting variation of the common voltage Vcom within a predetermined range ($\Delta$Th).

Referring to FIG. 9, the common voltage Vcom is prevented from being changed beyond the predetermined range ($\Delta$Th) at a time, thereby preventing abrupt variation of the common voltage Vcom. For instance, in one exemplary embodiment the predetermined range ($\Delta$Th) can be set to be no more than 3 levels. In this case, if the level of the common voltage Vcom to be changed is within the 3 levels, the common voltage Vcom is changed by the selected change in the common voltage Vcom. In addition, even if the level of the common voltage Vcom to be changed exceeds the 3-level (for instance, 5-level), the common voltage Vcom is changed only by the 3-level. Therefore, abrupt variation of the common voltage Vcom can be prevented by restricting the change in the common voltage Vcom as mentioned above.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:

a liquid crystal panel having a plurality of pixels;

a lookup table which stores information about a plurality of digital common voltages, each of the plurality of digital common voltages corresponding to at least one gray value;

a timing controller which analyzes gray characteristics of image signals to be displayed on the liquid crystal panel and which selects only one of the digital common voltages based on an analysis result; and a common voltage generator which generates only one analog common voltage in response to the one digital common voltage selected by the timing controller and which supplies the analog common voltage to the liquid crystal panel, wherein the timing controller determines a representative gray ratio using a histogram analysis result obtained based on each gray value of a red signal, a green signal and a blue signal constituting the image signal, and selects the digital common voltage corresponding to the representative gray ratio from the lookup table.

2. The liquid crystal display of claim 1, wherein the timing controller analyzes the gray characteristic of the image signal at least every frame.

3. The liquid crystal display of claim 1, wherein the timing controller determines a representative gray value using a histogram analysis result obtained based on gray values of substantially all of the image signals, and selects the digital common voltage corresponding to the representative gray value from the lookup table.

4. The liquid crystal display of claim 1, wherein the histogram analysis result obtained based on each gray value of the red signal, the green signal and the blue signal is multiplied by a weight value.

5. The liquid crystal display of claim 1, wherein the timing controller determines a representative gray value using an average of brightness components of gray values of the image signals, and selects the digital common voltage corresponding to the representative gray value from the lookup table.

6. The liquid crystal display of claim 5, wherein the brightness components are obtained by converting the image signals into national television system committee signals.

7. The liquid crystal display of claim 1, wherein the timing controller determines a representative gray value using an average of gray values of the image signals, and selects the digital common voltage corresponding to the representative gray value from the lookup table.

8. The liquid crystal display of claim 1, wherein the timing controller transmits the information about the digital common voltages to the common voltage generator through an inter-integrated circuit interface.

9. The liquid crystal display of claim 1, wherein a voltage level of the analog common voltage is gradually changed over a plurality of frames when a voltage variation range of the analog common voltage exceeds a predetermined voltage level.

10. The liquid crystal display of claim 1, wherein a voltage variation range of the analog common voltage is restricted to be within a predetermined voltage level per frame.

11. A method of generating common voltage, the method comprising:

analyzing gray characteristics of image signals;

determining a representative gray value based on an analysis result;

determining only one digital common voltage corresponding to the representative gray value; and generating only one analog common voltage corresponding to the digital common voltage, wherein the analyzing of the gray characteristic comprises:

converting a red signal, a green signal and a blue signal constituting the image signal into gray signals, respectively;

analyzing a histogram of the gray signals;

determining representative gray values of the gray signals based on a histogram analysis result, respectively; and multiplying the representative gray values by a weight value.

12. The method of claim 11, wherein the digital common voltage is updated at least every frame.

13. The method of claim 11, wherein a gray value having a highest frequency is determined to be the representative gray value.

14. The method of claim 11, wherein the analyzing of the gray characteristic comprises:

converting the image signal into a gray signal; and analyzing a histogram of the gray signal.

15. The method of claim 11, wherein the analyzing of the gray characteristic comprises:

converting the image signals into national television system committee signals; and converting the national television system committee signals into gray signals, wherein the gray signals include brightness components.

16. The method of claim 11, wherein the analyzing of the gray characteristic comprises:

converting the image signals into gray signals; and obtaining an average of the gray signals.

17. The method of claim 16, wherein the average of the gray signals is obtained based on red, green, and blue gray signals constituting the image signals.

18. The method of claim 16, wherein the average of the gray signals is obtained based on the gray signals of the image signals consisting of brightness components.

* * * * *